(No Model.)

W. J. GOING.
SUPPORT FOR INCANDESCENT LAMPS, &c.

No. 598,219. Patented Feb. 1, 1898.

Witnesses.
Mark W. Dewey
Alvin D. Allen

Inventor.
William J. Going
By C. H. Duell
his Attorney.

UNITED STATES PATENT OFFICE.

WILLIAM JOSEPH GOING, OF AMSTERDAM, NEW YORK, ASSIGNOR OF ONE-HALF TO LEONARD WELDON, OF SAME PLACE.

SUPPORT FOR INCANDESCENT LAMPS, &c.

SPECIFICATION forming part of Letters Patent No. 598,219, dated February 1, 1898.

Application filed July 21, 1897. Serial No. 645,328. (No model.)

*To all whom it may concern:*

Be it known that I, WILLIAM JOSEPH GOING, of Amsterdam, in the county of Montgomery, in the State of New York, have invented new and useful Improvements in Supports for Incandescent Lamps, &c., of which the following, taken in connection with the accompanying drawings, is a full, clear, and exact description.

My invention relates to adjustable supports for incandescent lamps, &c.; and the object is to provide a simple and inexpensive support that may be easily and quickly adjusted universally.

To this end my invention consists in the combination of a bracket adapted to be secured to a wall and provided with a curved bearing-surface, a yoke mounted to turn on said bracket and provided with a threaded aperture, and a rod or tube having a threaded end passing through said aperture and adapted to bear upon the curved bearing-surface of the bracket to hold the yoke from turning; and my invention consists in certain other combinations of parts hereinafter described.

Figure 1:
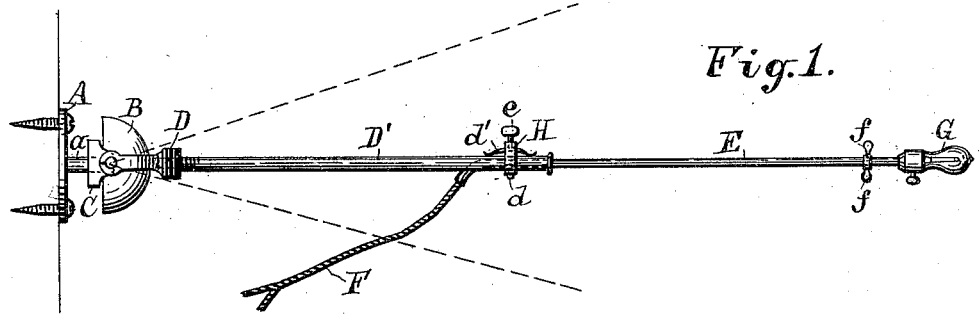
Figure 2:
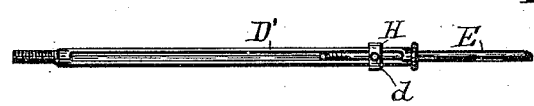
Figure 3:
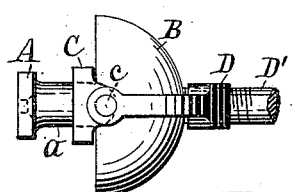
Figure 4:
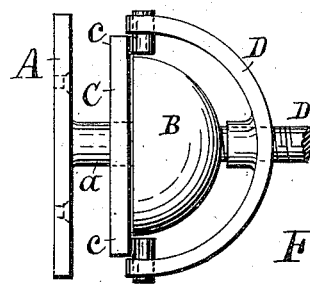
Figure 5:
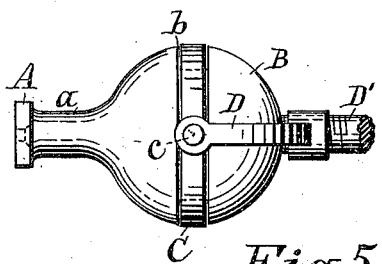
Figure 6:
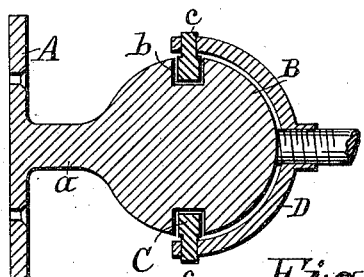
Figure 7:
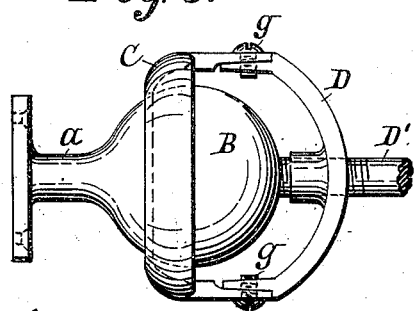

In the drawings hereto annexed and forming a part of this specification, Figure 1 is a side elevation of my improved adjustable support fixed to a side wall. Fig. 2 is a view of the slotted side of the tube of the bracket. Figs. 3 and 4 are enlarged side elevations of the universal joint of the said bracket. Figs. 5 and 6 are side and sectional views, respectively, of a modified form of universal joint that may be used in the bracket; and Fig. 7 is another modification.

Referring specifically to the drawings, A is the bracket, having the curved bearing-surface B. This bearing-surface, as clearly shown, may be spherical or hemispherical, and it is preferably formed convex. I preferably mount the curved or spherical portion on the spindle rigidly and form it integral with the spindle, as shown in the drawings. When the bearing is hemispherical, as shown in Figs. 1, 3, and 4 of the drawings, I mount a ring C on the spindle $a$ close to the flat side of the hemispherical part. Projections $c\ c$ radiate from diametrically opposite sides of the ring, upon the ends of which is fulcrumed a curved yoke D, which extends around the said curved bearing-surface. The yoke D is provided in its center with a threaded aperture, the axis of which radiates from the curved surface whatever the position of the ring C and yoke D. The outer tube D' of the extensible part of the support is provided with a threaded end which enters the threaded aperture in the support, and may be turned to bear upon the curved or convex bearing-surface to hold the extensible part or tubes in any suitable position.

When the tube D' is slightly unscrewed or does not bear upon the curved surface, said tube, together with the yoke D, may be turned in any direction from the bracket, for then the parts are loose. When the tube is turned to extend in the desired direction, by simply turning the tube D' on its axis or screwing it into the yoke D its end will be forced against the curved bearing-surface of the bracket. The ring C will then be drawn toward the flat surface and all the movable parts will be held firmly and rigidly in place.

The tube D' is slotted longitudinally on one side to permit a small yoke H to be secured by a screw $d$ to the inner tube E and to slide on the outer tube when the inner tube is moved in or out. The slide or yoke D is provided with a curved spring $d'$, which bears with its ends upon the tube D', and is adjusted by means of a screw $e$, passing through the yoke and bearing in a cavity in the center of the spring. The inner tube E has its inner end preferably bent to pass through the slot in the outer tube, so that there will be no wear upon the flexible conducting-cord F, passing through the tube upon the side walls of the slot when the inner tube is moved.

Fig. 1 shows an ordinary incandescent lamp G and its socket on the free end of the inner tube E. The projections $f$ serve as a handle or means for operating the inner tube or rotate the outer tube, and in fact as a means for operating the device generally, as will be obvious. When a gas-burner is substituted for the incandescent lamp, a flexible rubber tube is connected to the inner end of the tube E to carry the gas to the burner.

In Figs. 5 and 6 the curved bearing B is spherical, or at least the part having the curved bearing is spherical, and is provided with an annular groove *b* for the ring C, which in this structure is enlarged.

In Fig. 7 the sphere or ball is not grooved and the ring is beveled and mounted on the surface of the sphere. In this structure the yoke is secured to the ring by a pair of screws *g g* to permit the placing of the ring upon the ball.

Having described my invention, what I claim as new, and desire to secure by Letters Patent, is—

1. In an adjustable support, the combination of a bracket adapted to be secured to a wall and provided with a curved bearing-surface, a yoke mounted to turn on said bracket universally and provided with a threaded aperture, and a rod having a threaded end passing through said aperture and adapted to bear upon the curved bearing-surface of the bracket to hold the yoke from turning, as set forth.

2. In an adjustable support, the combination of a bracket adapted to be secured to a wall and provided with a convex bearing-surface, a yoke swiveled on said bracket to turn universally and provided with a threaded aperture, and a rod having a threaded end passing through said aperture and adapted to bear upon the curved bearing-surface of the bracket to hold the yoke from turning, as set forth.

3. In an adjustable support, the combination of a bracket adapted to be secured to a wall and provided with a curved bearing-surface, a yoke mounted to turn on said bracket and provided with a threaded aperture, a tube having a threaded end passing through the said aperture and adapted to bear upon the curved bearing-surface of the bracket, said tube being slotted longitudinally, a tube within the outer tube connected to the latter through the slot, and a device carried on the outer end of the inner tube, as set forth.

4. In an adjustable support, the combination of a bracket adapted to be secured to a wall and provided with a spherical bearing-surface, a yoke mounted to turn on said bracket and provided with a threaded aperture, a tube having a threaded end passing through the said aperture and adapted to bear upon the curved bearing-surface of the bracket, said tube being slotted longitudinally, a tube within the outer tube connected to the latter through the slot, and a device carried on the outer end of the inner tube, as set forth.

5. In an adjustable support, the combination of a bracket adapted to be secured to a wall and provided with a curved bearing-surface, a yoke mounted to turn on said bracket and provided with a threaded aperture, a tube having a threaded end passing through the said aperture and adapted to bear upon the curved bearing-surface of the bracket, said tube being slotted longitudinally, a tube within the outer tube connected to the latter through the slot, a conducting-cord passing through the tubes, a tension device between the tubes, a handle, and an incandescent lamp carried on the end of the inner tube, as set forth.

6. In an adjustable support, the combination with a bracket adapted to be secured to a wall and having a spindle with an enlarged hemispherical end, a ring mounted to turn on said spindle and having projections on diametrically opposite sides, a curved yoke fulcrumed on said projections and having a threaded aperture in its center, and a tube having a threaded end passing through the aperture and adapted to bear on the said hemispherical end of the spindle, as set forth.

7. In an adjustable support, the combination with a bracket adapted to be secured to a wall and having a spindle with an enlarged hemispherical end, a ring mounted to turn on said spindle and having projections on diametrically opposite sides, a curved yoke fulcrumed on said projections and having a threaded aperture in its center, and a tube having a threaded end passing through the aperture and adapted to bear on the said hemispherical end of the spindle, said tube being slotted longitudinally, a tube within the outer tube connected to the latter through the slot, and a device carried on the outer end of the inner tube, as set forth.

In testimony whereof I have hereunto signed my name.

WILLIAM JOSEPH GOING. [L. S.]

Witnesses:
JAMES A. SMEALLIE,
HENRY V. BURKE.